United States Patent [19]
Coy

[11] 3,881,385
[45] May 6, 1975

[54] PIPE CUTTING FIXTURE FOR BAND SAW

[75] Inventor: Vernon Carl Coy, Slidell, La.

[73] Assignee: Martin Marietta Corporation, New York, N.Y.

[22] Filed: Apr. 23, 1974

[21] Appl. No.: 463,234

[52] U.S. Cl.................... 83/411 R; 83/581; 83/452; 83/810; 83/466
[51] Int. Cl........................ B23d 53/06; B23d 55/04
[58] Field of Search ............. 83/810, 581, 452, 733, 83/809, 410, 411, 422, 466

[56] References Cited
UNITED STATES PATENTS

| | | | |
|---|---|---|---|
| 454,426 | 6/1891 | Campbell | 83/733 |
| 2,535,673 | 12/1950 | Forbes | 83/411 R |
| 2,746,125 | 5/1956 | Cuny | 83/810 |
| 3,764,126 | 10/1973 | Arenas | 83/411 R |

*Primary Examiner*—Donald R. Schran
*Attorney, Agent, or Firm*—Sughrue, Rothwell, Mion, Zinn & Macpeak

[57] ABSTRACT

A rectangular base plate has a arcuate opening within one side terminating in a narrow arm which projects within the opening and adjacent the one side, with the tip of the arm acting as the vertical pivot point for the plate outside and free of a band saw blade with the plate resting on the band saw table. A pivot pin fixed to a slide mounted to the table forms the pivot axis for the plate at the inner end of the projecting arm with the slide being movable towards and away from the band saw which passes through a semicircular opening within the band saw table. An L-shaped bracket adjustably mounted to the base plate carries a V-block pipe holder whose angle of inclination may vary and which supports the pipe to be severed such that the pipe axis intersects the base plate pivot axis. By adjusting the position of the slide and the angle of inclination of the V-block, the pipe may be cut at a desired angle and radius of cut by swinging the plate about its pivot axis.

4 Claims, 6 Drawing Figures

PIPE CUTTING FIXTURE FOR BAND SAW

BACKGROUND OF THE INVENTION

1. Field of the Invention

This invention relates to a fixture for cutting a pipe at an angle and radius permitting it to be welded at a desired angle of intersection with respect to another section of pipe.

2. Description of the Prior Art

In general, joining of pipe and tube sections requires the cutting of one pipe to be joined to another at a given angle and radius of cut prior to welding of the two pipes or tube sections together. In the majority of cases, this has involved hand cutting, hand filing and fitting. In an attempt to insure accuracy of cut, both in terms of angle and radius, band saws which are normally employed in cutting of the pipe or tube sections have been provided with specially manufactured fixtures of an adjustable nature to effect a variant in the position of the pipe with respect to the cutting blade, depending upon the angle and position to which one pipe being cut must have with respect to the pipe to which it is being joined.

One such fixture which has performed that function is set forth in U.S. Pat. No. 2,746,125 to Ernest A. Cuny. The Cuny device is characterized by a horizontal base plate which is supported on a band saw table for movement along an axis which intersects the vertical axis of the saw blade. The base plate is provided with a rotatable ring receiving the saw blade and serves to support the pipe being cut such that the axis of the pipe being severed intersects the vertical axis normally corresponding both to the center rotation of the ring and the axis of the saw.

While the fixture permits both the angle and radius to be varied, for the pipe being severed, the fixture has a number of disadvantages. First, since the slidable portion of the base plate terminates in a closed ring, it is necessary to sever the saw blade, pass it through the center of the ring and then weld during set up of the fixture with respect to a conventional band saw, not so provided, each time piping or tubing is to be severed. Secondly, in achieving a change in radius insofar as the cut is concerned, the movable portion of the base or slide can be shifted only to the extent of the diameter of the open portion of the ring, otherwise, the band saw would be severing the fixture itself. Further, in order for the fixture to be removed or to permit normal operation of the band saw, the blade must again be severed, the fixture must be removed and the band saw blade rewelded.

The present invention therefore has the object of providing an improved pipe cutting fixture for a band saw permitting the fixture to be readily attached and detached without the need for severing of the saw blade and rewelding of the blade after attachment of the fixture. It is a further object of the present invention to provide an improved pipe cutting fixture for a band saw in which the fixture may be easily moved to an out of way position with respect to the band saw to permit, at least, limited operation of the band saw in a normal manner, thus reducing the number of times that the fixture has to be attached and detached from the band saw.

SUMMARY OF THE INVENTION

The present invention is directed to an improved fixture for attachment to a band saw for cutting a pipe at varying angles and radius to match the curvature of another pipe to which the severed pipe is to be joined. The band saw comprises a horizontal table including an open center portion with an endless band saw blade passing therethrough and means for driving the blade to effect cutting of a pipe supported relative to the table and the blade. A fixture includes a base plate overlying the table and means for pivoting the base plate about the vertical pivot axis and for moving the plate horizontally along a path intersecting the plate pivot axis and the vertical axis of the blade. Clamping means carried by the plate holds the pipe axially aligned with the plate pivot axis. Means are provided for pivoting said clamping means and said pipe about a horizontal axis intersecting the vertical pivot axis.

The invention resides in the improvement wherein said plate is mounted for rotation about a horizontally shiftable and vertical pivot axis which is parallel to the vertical axis of the saw blade and said plate lies completely outside of and completely free of said band saw blade.

Preferably, the plate is generally rectangular in form and is provided with an arcuate opening within one side terminating in a narrow arm which projects within the opening and adjacent said one side and said means for pivoting said base plate comprises a slide mounted on said table for longitudinal movement toward and away from the saw blade and a pivot pin carried by said slide and pivotably coupling the end of said arm of said plate to said slide. An L-shaped bracket is mounted on the base plate and includes a horizontal base portion adjustably mounted on the base plate and a vertical portion including at least one vertical slot, said pipe is held to the L-shaped bracket by a V-block type pipe holder, one side of which is fixed to a V-shaped angle adjustment plate which is provided with a pivot pin at a lower apex portion, slidably mounted within the vertical slot of the bracket and provided with an arcuate slot at the top which receives a second pin which also projects through the vertical slot and permits the pipe axis to be inclined relative to the vertical axis of the saw blade.

DESCRIPTION OF THE PREFERRED EMBODIMENT

Figure 1:
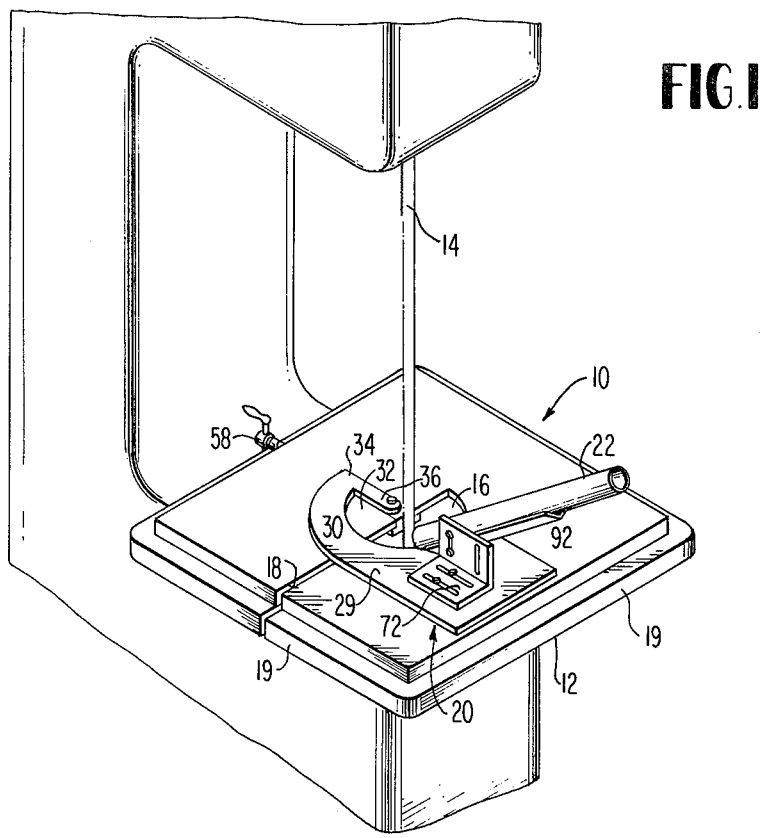
FIG. 1 is a perspective view of a band saw incorporating the improved pipe cutting fixture of the present invention.
Figure 6:
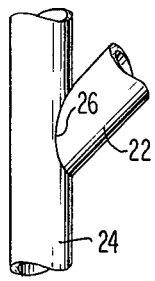
FIG. 6 is a perspective view of the pipe section illustrated in FIGS. 1-4, subsequent to severing, and welded to a second pipe section.
Figure 2:
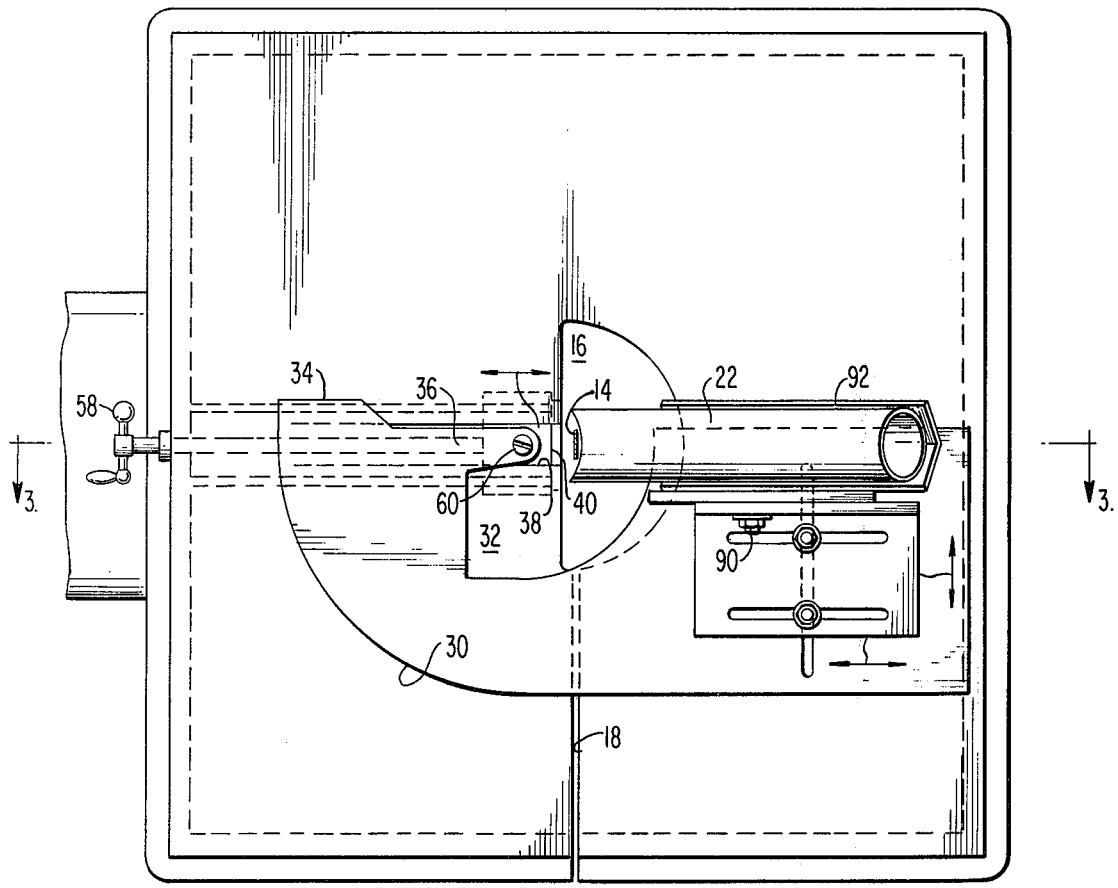
FIG. 2 is a top plan view of a portion of the band saw of FIG. 1 incorporating the pipe cutting fixture.

The improved pipe cutting fixture of the present invention is preferably employed as a readily detachable addition to an existing band saw and one which may be readily swung to an out of way position with respect to the work access portion of the saw to permit limited use of the saw without the necessity of detaching or removing the fixture. In this respect, a band saw indicated generally at 10 is provided with a bed or table 12 and an endless saw blade 14 which extends vertically through a clearance opening 16 of half moon shape within the center of table 12, the clearance opening 16 extending by way of slot 18 to the outer edge or periphery 19 of the table 12 to permit ready blade replacement when the blade is broken or dulled. The means within the saw 10 for driving the saw blade is not shown, but the blade moves at relatively high speed with the portion illustrated moving vertically to effect severance of a work piece moved relative to its cutting edge. The present invention is directed to an improved, highly versatile and simplified pipe or tube cutting fixture indicated generally at 20 and which supports a piece or section of pipe 22 for severing at a desired angle and radius to permit its attachment as shown in FIG. 6 to a second piece of pipe 24 such that the edge 26 conforms exactly to the periphery of the pipe section 24 and is positioned at a correct angle with respect to that pipe section so as to insure welding of two matching surfaces whose precision and smoothness are closely controlled.

Figure 3:
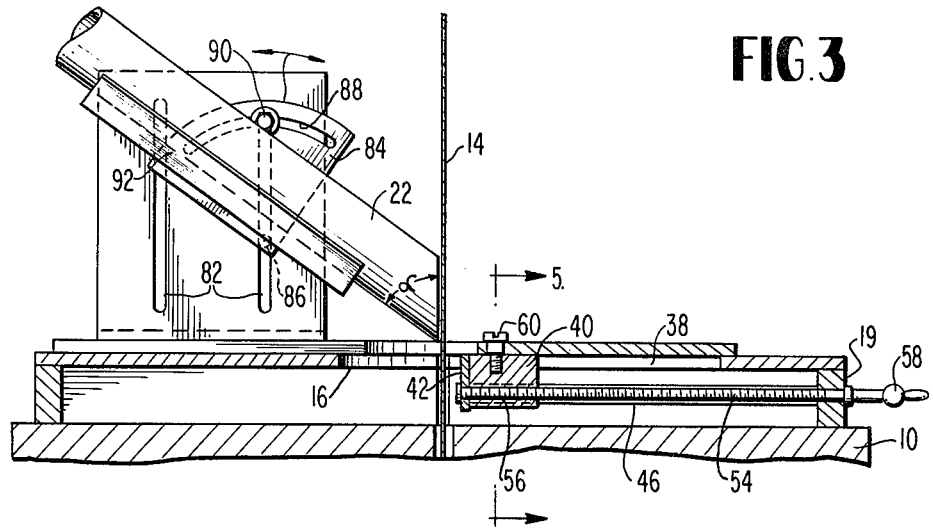
FIG. 3 is a sectional, elevational view of the band saw and fixture of FIGS. 1 and 2 taken about line 3—3.

In this respect, the pipe cutting fixture 20 comprises essentially a base plate 28 which is generally rectangular in form although in plan configuration one corner is curved as at 30. The base plate is characterized essentially by having an arcuate opening 32 formed therein from side 34 inward and forming a pivot arm 36 which extends along edge 34 and within arcuate opening 32. The bed or table 12 is provided, as is best seen in FIG. 3, with an elongated rectangular guide slot 38 which opens up into the half moon opening 16 at the center of its base line, the guide slot 38 being relatively narrow and having an inboard shaft support plate 42 spanning its inboard end and being affixed at both sides to the bottom of the table 12 by means (not shown). A T-shaped metal slide 40 includes a projecting portion 44 which is of a width corresponding to the width of the guide slot 38 and is positioned therein, and is supported for movement relative to the guide slot 38 by a pair of guide shafts 46 fixedly mounted at their inboard ends to the shaft support plate 42 and being fixed at the opposite end to the outer edge 19 of table 12. Slide 40 is provided with a pair of smooth bores 50 which receive the guide shafts 46, respectively, and upon which the slide moves. Further, a threaded actuating shaft 54 is rotatably mounted at respective ends within the shaft support plate 42 and the edge 19 of the table. Slide 40 is provided with a threaded bore 56 which mates with the threads of the actuating shaft 54 such that rotation of the actuating shaft shifts the slide longitudinally within guide slot 38 supported on and guided by the guide shafts 46 which extend parallel to actuating shaft 54 and on each side thereof. The operating head 58 is rotated to effect movement of the slide 40 towards and away from saw blade 14. A pivot pin 60 has a relatively large diameter unthreaded portion 62 which is received within a hole 64 of the base plate pivot arm 36 while the pivot pin 60 terminates in a smaller diameter threaded portion 65 which is threadably received by a tapped and threaded hole 66 within the upper face of slide 40, thus easily permitting the base plate 28 to pivot about a horizontally shiftable vertical axis passing through slide 44.

In order to position the pipe or tube 22 for severance by the saw blade 14, the base plate 28 is provided with a transverse slot 70 which is at right angles to the longitudinal axis of the base plate which adjustably supports, to which is adjustably mounted an L-shaped bracket 72 comprising a horizontal base portion 74 and a vertical side wall 76. The base portion 74 is further provided with a pair of parallel slots 78 which receive mounting bolts 80, the bolts also passing through slot 70 such that the bracket 72 can be shifted at right angles in two mutually distinct right angle directions relative to the underlying base plate 28. In turn, the vertical slide wall 76 is provided with a pair of horizontally spaced, vertical slots 82 which extend upwardly from the base portion 74 and terminate just below the top of the side wall portion 76. A generally V-shaped angle adjusting plate 84 carries a guide pin 86 which rides within a selected one of the vertical slots 82, the angle adjusting plate 84 being further provided at its upper end with an arcuate slot 88 which in turn carries a bolt and nut assembly 90 which extends through the angle adjusting plate and terminates within the selected vertical slot 82 of the vertical side wall 76. By use of bolt and nut assembly 90 and guide pin 86, the vertical height of the angle adjustment plate may be readily varied as well as the angle of inclination of the V-block pipe holder 92 which is fixed to one side of the angle adjusting plate 84 and which supports the pipe section 22, whose lower end is to be cut at a desired angle and radius of cut.

Figure 4:
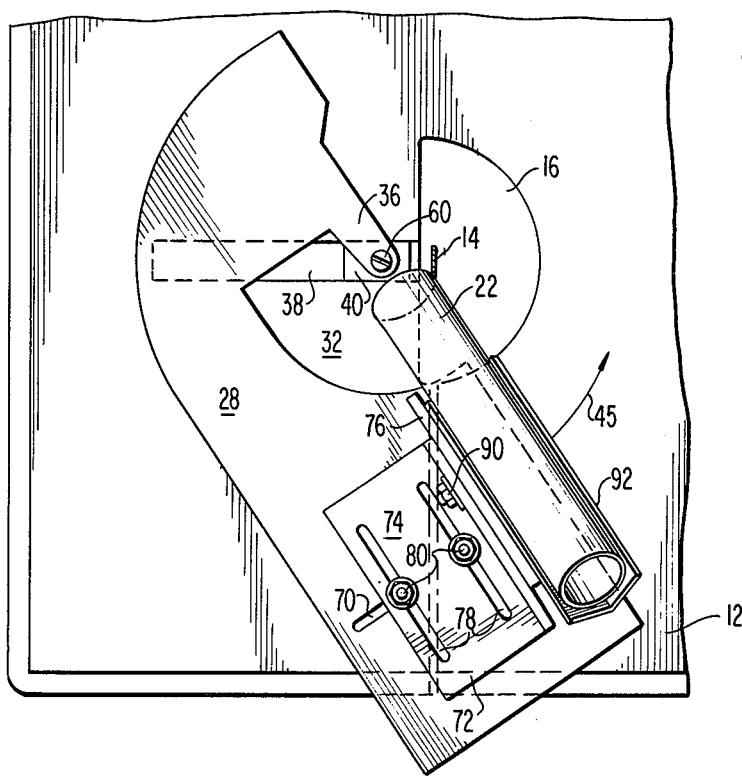
FIG. 4 is a top plan view similar to that of FIG. 2 with the fixture rotated about its vertical pivot axis.
Figure 5:
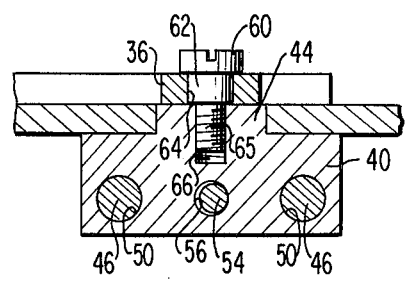
FIG. 5 is a sectional, elevational view of a portion of the band saw with the fixture and band saw as depicted in FIG. 3, taken about line 5—5.

While not shown, one or more band clamps may hold the pipe section 22 fixed within the V-block 92. The position of the V-block 92 is adjusted so that the axis of the pipe 22 intersects the pivot axis as defined by pivot pin 60, while the slide 40 is moved toward and away from the saw blade 14 via slide 40 to vary the radius of cut. Cutting is effected by swinging (as best seen in FIG. 4) the pipe 22 across and through the cutting edge of the saw blade 14 as it moves vertically at high speed to effect arcuate severance as indicated by arrow 45. This completes a cut at a given angle $\alpha$ FIG. 3, depending upon the setting of the angle adjustment plate 84 and thus the pipe section 22 with respect to the horizontal as defined by base plate 28. The radius of cut depends on the position of slide 40 and the vertical pivot axis for plate 28.

As seen particularly from FIG. 4, with the base plate 28 rotated to a position where the plate and the supported pipe section 22 lie completely to one side of and completely free of the saw blade 14, the slide 40 may be moved away from the saw blade 14 to the extent determined by the length of the guide slot 38 and opening 32. While it may be appreciated that the V-block 92 insures the centering of the pipe 22 with respect to the pivot axis of the base plate 28 as defined by pivot pin 60 regardless of the size of the pipe, slots 70 and 78 permit the angle adjusting plate and the V-block as an assembly to be adjusted about mutually distinct right angle directions to provide greater versatility to the fixture. The elements of the fixtures are preferably formed of metal such as sheet metal stock.

Various geometries may be employed for the material support 92 to accommodate different configured material such as I-beams, rectangular tubes, or the like. There is no necessity for the support 92, therefore, to comprise a V-block. Further, by the employment of right angle intersecting slots 70 for the base plate and 78 for the base of the L-shaped bracket, the material support in V-block form at 92 or otherwise may be adjusted longitudinally, and most importantly, laterally, in order to permit the material cuts to be less than completely through the total diameter or lateral dimension of the material being cut. Further, by reversing the material support in terms of the angle of inclination relative to the horizontal, male cuts may be made rather than the female cut illustrated in the drawings. This may be achieved most readily by simple shifting the angle adjustment plate from one side of the L-shaped bracket to the other which will present the normally forwardly and downwardly inclined pipe 22 to blade 14, forwardly and upwardly relative to the same blade.

While the invention has been particularly shown and described with reference to a preferred embodiment thereof, it will be understood by those skilled in the art that various changes in form and details may be made therein without departing from the spirit and scope of the invention.

What is claimed is:

1. In a fixture for attachment to a band saw for facilitating the cutting of pipe at varying angles and radii to match the curvature of another pipe to which the cut pipe is to be joined, and wherein said band saw comprises a horizontal table including an open center portion with an endless band saw blade projecting therethrough and means for driving said blade to effect cutting of a pipe supported on said table and movable relative to said blade, and wherein said fixture includes a base plate overlying said table, means for pivotably mounting said plate for pivoting about a vertical pivot axis and for moving said plate horizontally along a path including the plate pivot axis and the saw blade, pipe support means carried by said plate for holding said pipe in axial alignment with the plate pivot point and means for pivoting said pipe about a horizontal axis intersecting said vertical pivot axis, the improvement wherein: said means for mounting said plate for pivoting about a vertical axis comprises means for mounting said plate on said table parallel to the saw blade where it projects through said table and to one side and free of said blade, said plate being provided with an arcuate opening through which said blade projects and said blade including a narrow arm which projects within said opening with the vertical pivot axis of said plate extending through said arm.

2. The fixture as claimed in claim 1, wherein said plate is generally rectangular in plan configuration, said arcuate opening is provided within one side of said plate and terminates in said narrow arm adjacent said one side of said plate.

3. The fixture as claimed in claim 1, wherein said table includes a guide slot intersecting said arcuate opening and extending away from said saw blade and said means for moving said plate horizontally along a path intersecting the plate pivot axis and the vertical axis of the saw comprises a slide supported by said table and movable within said guide slot, said slide having a pivot pin projecting upwardly therefrom and said arm including a vertical opening therein receiving said pin.

4. The fixture as claimed in claim 3, wherein; said open center portion of said table comprises a half moon shaped opening whose base portion intersects said guide slot and wherein said pipe holding means comprising an L-shaped bracket having a base portion laterally and longitudinally adjustably mounted to said base plate to the side of said arcuate opening remote from said pivot arm, said bracket includes a vertical sidewall having at least one vertical slot therein, a fan shaped angle adjustment plate diverges, carries a pivot pin at the apex thereof positioned within said vertical slot, said fan shaped angle adjusting plate includes an arcuate slot at its diverged and opposite said apex and an adjusting bolt assembly extends through the vertical slot of said bracket sidewall and the arcuate slot of said angle adjusting plate respectively to couple said angle adjusting plate to the side of the vertical sidewall of said bracket and a V-block is fixedly carried by said angle adjusting plate and has the pipe to be cut fixedly cradled therein, such that the angle of cut of said pipe may be varied by adjusting the position of the bolt assembly relative to the arcuate slot and male or female cuts may be made by inclining the pipe upwardly or downwardly relative to the vertical saw blade.

* * * * *